United States Patent
Kang et al.

(10) Patent No.: US 8,009,728 B2
(45) Date of Patent: Aug. 30, 2011

(54) PARALLEL EQUALIZER FOR DS-CDMA UWB SYSTEM AND METHOD THEREOF

(75) Inventors: Kyu-Min Kang, Daejon (KR); Cheol-Ho Shin, Daejon (KR); Sung-Woo Choi, Daejon (KR); Sang-In Cho, Daejon (KR); Sang-Sung Choi, Daejon (KR); Kwang-Roh Park, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 802 days.

(21) Appl. No.: 11/635,937

(22) Filed: Dec. 8, 2006

(65) Prior Publication Data

US 2007/0133670 A1 Jun. 14, 2007

(30) Foreign Application Priority Data

Dec. 9, 2005 (KR) .................. 10-2005-0121108
Jun. 29, 2006 (KR) .................. 10-2006-0059468

(51) Int. Cl.
*H03H 7/30* (2006.01)

(52) U.S. Cl. ........ 375/232; 375/229; 375/231; 375/233; 375/147; 375/316; 333/18; 333/28; 455/307

(58) Field of Classification Search .................. 375/229, 375/231, 232, 233, 147, 316, 350; 333/18, 333/28; 455/307
See application file for complete search history.

(56) References Cited

U.S. PATENT DOCUMENTS

| | | | | |
|---|---|---|---|---|
| 5,414,732 A | * | 5/1995 | Kaufmann | ..................... 375/232 |
| 6,332,000 B1 | | 12/2001 | Lee | |
| 7,346,104 B2 | * | 3/2008 | Yu et al. | ......................... 375/233 |
| 2003/0219083 A1 | * | 11/2003 | Graumann | ..................... 375/341 |
| 2005/0185743 A1 | * | 8/2005 | Li | ................... 375/350 |
| 2006/0098726 A1 | * | 5/2006 | Pan et al. | ...................... 375/229 |
| 2007/0025434 A1 | * | 2/2007 | Sternberg et al. | ............. 375/229 |
| 2007/0147489 A1 | * | 6/2007 | Sun et al. | ....................... 375/231 |

FOREIGN PATENT DOCUMENTS

| | | |
|---|---|---|
| KR | 1995-0026276 A | 9/1995 |
| KR | 102001061588 | 7/2001 |
| KR | 1020050058372 A | 6/2005 |

OTHER PUBLICATIONS

Gi-Hong Im et al; "Performance of a Hybrid Decision Feedback Equalizer Structure for CAP-Based DSL Systems." IEEE Transactions on Signal Processing, vol. 49, No. 8, Aug. 2001.

* cited by examiner

*Primary Examiner* — Chieh M Fan
*Assistant Examiner* — Siu M Lee
(74) *Attorney, Agent, or Firm* — Ladas & Parry LLP (57) ABSTRACT

A parallel equalizer for a DS-CDMA UWB system and method thereof are provided. The parallel equalizer includes: a filter block for filtering a training input signal in a 'training mode', and filtering the plurality of input signals in parallel in a 'symbol decision mode'; a symbol decision block for obtaining a symbol error based on a output from the filter block and a training symbol in the 'training mode', and estimating a transmission symbol for each of the input signals in the 'symbol decision mode', obtaining an error of one among the estimated transmission symbols for a symbol error calculating input signal; and an weight update block for updating a filter tap coefficients of the filter block based on the training input signal or the symbol error calculating input signal and the symbol error and transmitting the updated filter tap coefficients into the filter block.

8 Claims, 4 Drawing Sheets

PARALLEL EQUALIZER FOR DS-CDMA UWB SYSTEM AND METHOD THEREOF

FIELD OF THE INVENTION

The present invention relates to a parallel equalizer for a direct sequence-code division multiple access (DS-CDMA) ultra wide-band (UWB) system and a method thereof; and, more particularly, to a parallel equalizer for a DS-CDMA UWB system and method thereof which updates filter tap coefficients based on a weight update block (WUB) and estimates transmission symbols in L filter blocks (FB), different from updating the filter tap coefficients of L WUBs individually in the conventional parallel equalizer to thereby decrease a complexity and a power consumption of the parallel equalizer.

DESCRIPTION OF RELATED ART

A direct sequence-code division multiple access (DS-CDMA) ultra wide-band (UWB) system transmits signals by using an ultra wide-band frequency. Therefore, a serious synchronous error of the signals by a multi-path fading and a phase offset occurred by a multi-path of transmission channel, and a frequency offset occurring between clocks used in a radio frequency (RF) transceiver are generated when the signals are transmitted.

To solve the serious synchronous error, a module for setting a packet synchronization and a symbol synchronization is designed and a channel estimator and a rake receiver for dealing with a channel variation during data frame transmission period are used for recovering a transmission data in a receiving block.

However, delay of the multi-path fading is equal to or more than 150 to 200 nsec in a UWB channel environment. Since an inter-symbol interference (ISI) occurred in data transition cannot be removed by only the rake receiver, performance of a DS-CDMA UWB modem receiver is dropped. Therefore, an equalizer should be employed to a receiving unit of the DS-CDMA UWB modem for overcoming the above problems.

In a data frame structure of the DS-CDMA UWB modem, a normal preamble is allocated with 15 μs. Herein, an allocated duration for converging filter tap coefficients of the equalizer by using a training symbol in order to remove the ISI is between 10 μs and 15 μs after transmitting a first preamble sequence. Since convergence of the equalizer by using the training symbol and processing of high-speed data should be performed within the duration of preamble transmitting in the UWB system, the equalizer of the receiving block is needed to be designed as a parallel processing structure.

Generally, the filter tap coefficients of a symbol rate linear equalizer (SRLE) performing a parallel processing are adapted by a least mean-square algorithm. The least mean-square algorithm updates the filter tap coefficients in an opposition direction of a noisy error gradient. An adaptation (optimization) of the $l^{th}$ filter tap coefficients of the equalizer is expressed by the following Eq. 1.

$$c_{n+1,l} = c_{n,l} + \Delta_{ff} e_{n,l} r_{n,l}, \quad l = 0, 1, \ldots, L-1 \qquad \text{Eq. 1}$$

Herein, an error rate $e_{n,l}$ corresponds to $\hat{S}_{n-1} - c_{n,l}^T r_{n,l}$; $\hat{S}_{n-1} = S_{n-1-d}$ is an output of the slicer at the $n^{th}$ symbol period; d denotes a overall delay from the transmitter to the receiver in baud rate interval. $\Delta_{ff}$ is a step size, and the symbol $(\cdot)^T$ is a transpose of $(\cdot)$.

The real vector of the $l^{th}$ filter tap coefficients of the equalizer $c_{n,l}^T$ and the real vector of an $l^{th}$ input signal of the equalizer $r_{n,l}^T$ are expressed by the following Eq. 2.

$$c_{n,l}^T = [c_{n,l,0} \, c_{n,l,1} \ldots c_{n,l,N-1}]$$

$$r_{n,l}^T = [r_{n-l} \, r_{n-4-l} \ldots r_{n-4(N-1)-l}] \qquad \text{Eq. 2}$$

Herein, N is the number of the filter tap coefficients of the SRLE.

Figure 1:
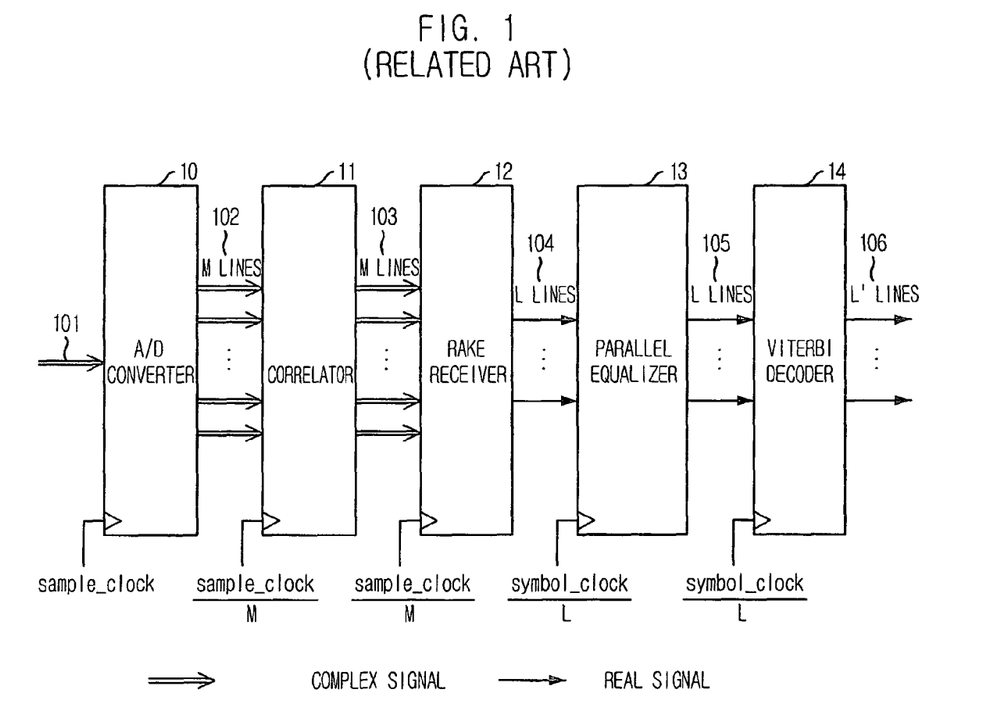
FIG. 1 is a diagram of a general receiver of DS-CDMA UWB modem.

FIG. 1 is a diagram of a general receiver of DS-CDMA UWB modem.

The receiver of DS-CDMA UWB modem (hereinafter, which is referred to as DS-CDMA UWB modem receiver) includes an analog/digital converter (ADC) 10, a correlator 11, a rake receiver 12, a parallel equalizer (an L-parallel equalizer) 13 and a viterbi decoder 14.

A RF processing block (not shown in FIG. 1) of the DS-CDMA UWB modem receiver receives an RF transmission signal from a transmitter, converts the RF transmission signal into an analog baseband signal and transmits the analog baseband signal to the ADC 10.

The ADC 10 receives and converts the analog baseband signal 101 into a digital signal 102 (M digital signals). The correlator 11 receives the M digital signals 102 from the ADC 10, performs correlation detection operation for the M digital signals and outputs M result signals (complex correlation signal) 103 into the rake receiver 12.

The rake receiver 12 receives the M complex correlation signals from the correlator 11 and outputs L real symbol signals 104 into the parallel equalizer 13. The parallel equalizer 13 receives the L real symbol signals, eliminates the ISI and outputs L symbol decision signals 105.

Then, the viterbi decoder 14 receives the L symbol decision signals from the parallel equalizer 13 and obtains an encoding gain. Herein, the viterbi decoder 14 which is a decoder designed in the receiver based on a convolution encoder of the transmitter having L' outputs signals 106 (M>L>L').

Figure 2:
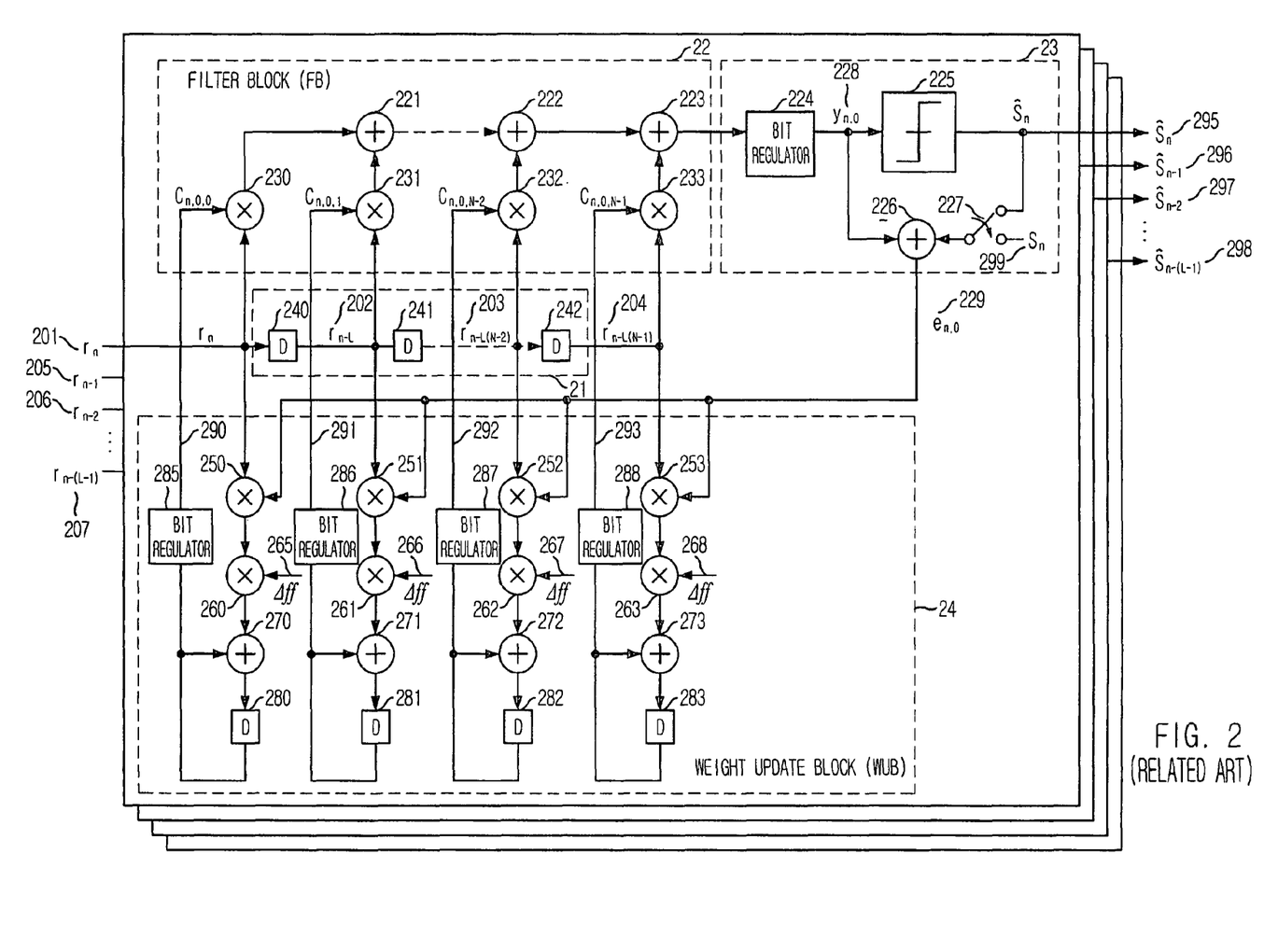
FIG. 2 is a detailed diagram illustrating a conventional parallel equalizer for the DS-CDMA UWB modem receiver.

FIG. 2 is a detailed diagram illustrating a conventional parallel equalizer and represents the L-parallel equalizer 13 applied to the DS-CDMA UWB modem receiver generally.

As shown in FIG. 2, each equalizer (equalizing block) of the L-parallel equalizer 13 used in the DS-CDMA UWB modem receiver includes a weight update block (WUB) 24, a delaying block 21, a filter block (FB) 22 and a symbol decision block 23.

The WUB updates the filter tap coefficients by using an input signal of the equalizer and a symbol error extracted in the slicer. The delaying block 21 delays the input signal of the equalizer and obtains N signals used in the FB 22 and the WUB 24. Herein, the delaying block 21 is presented as separate block, but the delaying block 21 may be included in the FB 22 and the WUB 24.

The FB 22 obtains a symbol decision signal by using the updated filter tap coefficients from the WUB 24 and the input signal of the equalizer. The symbol decision block 23 decides a transmission symbol based on a result from the FB 22 or obtains the symbol error.

Among the L input signals of equalizer outputted from the rake receiver 12, a first input signal $r_n$ 201 is used as a input signal of a first FB; a second input signal $r_{n-1}$ 205 is used as a input signal of a second FB; a $L^{th}$ input signal $r_{n-(L-1)}$ 207 is used as a input signal of a $L^{th}$ FB.

The conventional parallel equalizer is formed by L equalizing blocks having same structure. A first equalizing block will be described as below and L-1 numbers of equalizing blocks are designed as the same as the first equalizing block.

As shown in FIG. 2, the N input values ($r_n$, $r_{n-L}$, ..., $r_{n-L(N-1)}$) used in the FB 22 and the WUB 24 are generated by passing the input signal of equalizer $r_n$ through N−1 D flip-flops 240 to 242.

The FB 22 includes N multiplier 230 to 233 for multiplying the N filter tap coefficients ($c_{n,0,0}$, $c_{n,0,1}$, ..., $c_{n,0,N-1}$) updated in the WUB 24 and the N input signals ($r_n$, $r_{n-L}$, ..., $r_{n-L(N-1)}$) outputted from the delaying block 21, respectively, and adders 221 to 223 for adding results from the multipliers. Then, the adding result is transmitted into the slicer 225 through a bit regulator 224.

First, when the parallel equalizer operates in a 'training mode', the training symbol $S_n$ is inputted into a subtractor 226 by moving a switch into downside. That is, the training symbol is adopted as a symbol value. Then, the subtractor 226 obtains a symbol error $e_{n,0}$ by subtracting the training symbol $S_n$ and a symbol decision signal $y_{n,0}$.

Meanwhile when the parallel equalizer operates in a 'symbol decision mode', a symbol signal $S_n$ from the slicer 225 is inputted into the subtractor 226 by moving a switch into upside. Then, the subtractor 226 obtains a symbol error $e_{n,0}$ by subtracting the symbol signal $S_n$ and the symbol decision signal $y_{n,0}$.

Below, the WUB will be described in detail. The conventional parallel equalizer includes L WUBs having same structure.

The WUB 24 includes N first multipliers 250 to 253, N second multipliers 260 to 263, N D flip-flops 280 to 283, N adders 270 to 273 and N bit regulators 285 to 288.

The N first multipliers 250 to 253 multiply the symbol error $e_{n,0}$ 229 from the symbol decision block 23 and the N input signals ($r_n$, $r_{n-L}$, ..., $r_{n-L(N-1)}$), respectively.

The N second multipliers 260 to 263 multiply the multiplying results of the N first multipliers 250 to 253 and the step size $\Delta_{ff}$ to update the filter tap coefficients in every symbol. The N second multipliers 260 to 263 are embodied as shift operators performing a right or left shifting in practice.

The N adders 270 to 273 calculate new filter tap coefficients by adding the previous filter tap coefficients stored in D flip-flops 280 to 283 and results from the corresponding second multiplier, respectively. Herein, the D flip-flops 280 to 283 store the result (the previous filter tap coefficients) within one symbol duration for updating the filter tap coefficients continuously. The bit regulators 285 to 288 control bits of the filter tap coefficients.

When 'next symbol' is inputted, the resulting filter tap coefficients are reused for determining a transmission symbol in the FB 22 and updating the filter tap coefficients in WUB 24.

Since the conventional parallel equalizer includes the L WUBs for updating the filter tap coefficients in every operating clock and the L FBs for estimating a transmission signal by using the updated filter tap coefficients, the system is complex and high-power consumption.

Meanwhile, general UWB system uses an ultra-wideband more than 500 MHz. Since application manufactured goods are installed in home inside, mobility is very low. Therefore, because a Doppler frequency spread of UWB channel is near '0' and a coherence time is long, a state of channel during several symbol transmitting durations does not change in the UWB system working several tens to several hundreds Mbps. Moreover, UWB chipset may be embedded in various digital image applications, PC products and digital individual appliance products. A UWB modem chip should be low-power consumption and small-sized by improving a modem receiving block to realize the above.

That is, low-complexity equalizer is needed for the modem receiving block of a wireless personal area network (WPAN) using wide band frequency like the UWB system and having low channel variation.

SUMMARY OF THE INVENTION

It is, therefore, an object of the present invention to provide a parallel equalizer for a DS-CDMA UWB system and method thereof which updates filter tap coefficients based on a weight update block (WUB) and estimates transmission symbols in L filter blocks (FB), different from updating the filter tap coefficients of L WUBs individually in the conventional parallel equalizer to thereby decrease a complexity and a power consumption of the parallel equalizer.

In accordance with an aspect of the present invention, there is provided a parallel equalizer for a DS-CDMA UWB system, including: a filter block for filtering a training input signal which is one among a plurality of input signals when the parallel equalizer operates in a 'training mode', and filtering the plurality of input signals in parallel when the parallel equalizer operates in a 'symbol decision mode'; a symbol decision block for obtaining a symbol error based on a output from the filter block and a training symbol in the 'training mode', and estimating a transmission symbol for each of the input signals based on outputs from the filter block in the 'symbol decision mode', obtaining an error of one among the estimated transmission symbols for a symbol error calculating input signal; and an weight update block for updating a filter tap coefficients of the filter block based on the training input signal or the symbol error calculating input signal and the symbol error obtained in the symbol decision block and transmitting the updated filter tap coefficients into the filter block.

In accordance with another aspect of the present invention, there is a method for equalizing a signal in parallel for a DS-CDMA UWB system, including the steps of: a) filtering an input signal (a training input signal) among a plurality of input signals and obtaining a first symbol error based on the filtered training input signal and a predetermined training symbol; b) updating filter tap coefficients used step a) based on the first symbol error and the training input signal and going on step a) until the filter tap coefficients are converged; c) setting the final updated filter tap coefficients at step b) when the filter tap coefficients are converged as an initial filter tap coefficients, filtering for the plurality input signals in parallel and estimating transmission symbols for the filtered input signals; d) obtaining a second symbol error for a second input signal (a symbol error calculating input signal) among the plurality of the input signals estimated in step c) and going on step a) until transmission of the data frame is completed; and e) updating the filter tap coefficients used filtering in step c) based on the second symbol error and the symbol error calculating input signal and going on step d).

The present invention is related to a parallel equalizer for a DS-CDMA UWB system and method thereof. That is, a low complexity equalizer is provided suitable for a modem receiver of a wireless personal area network (WPAN) such as a UWB system using wide band frequency and having low channel variation.

In present invention, when L-parallel equalizer is designed, the filter tap coefficients are updated based on one WUB and transmission symbol is estimated by transmitting the filter tap coefficients into the L FBs different from updating the filter tap coefficients in L WUBs in every time in order to obtain the filter tap coefficients.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

The above-described objects, characteristics, and advantages of the invention will become apparent from the following description of the embodiments with reference to the accompanying drawings, which is set forth hereinafter. The invention may, however, be embodied in many different forms and should not be construed as being limited to the embodiments set forth herein; rather, these embodiments are provided to fully convey the concept of the invention to those skilled in the art. Also, in the description of the present invention, descriptions of related and published skills shall be omitted when they are deemed to induce unclearness in the purpose of the inventive description.

Figure 3:
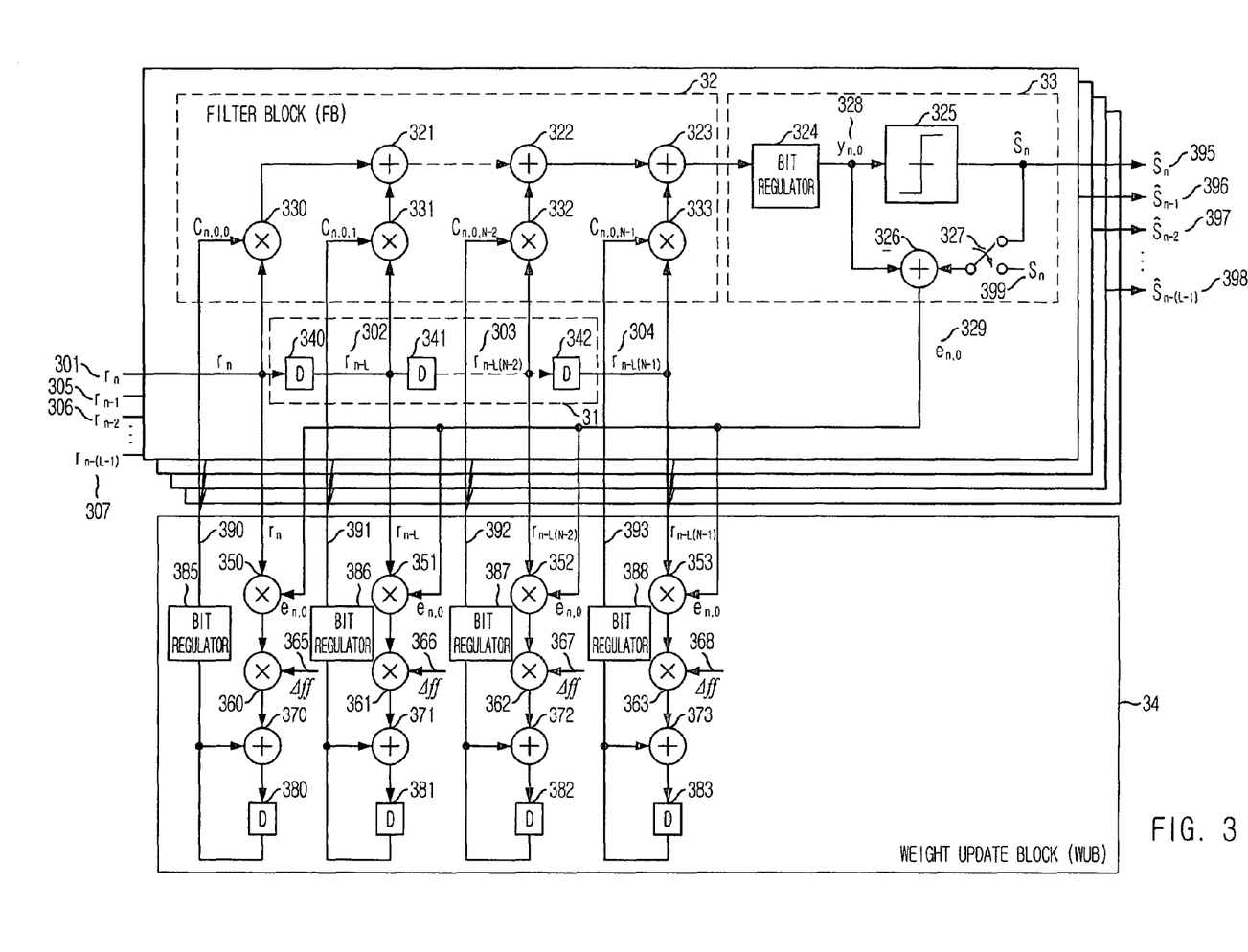
FIG. 3 is a diagram showing a parallel equalizer for the DS-CDMA UWB modem receiver in accordance with an embodiment of the present invention.

FIG. 3 is a diagram showing a parallel equalizer for the DS-CDMA UWB system in accordance with an embodiment of the present invention. That is, FIG. 3 represents the parallel equalizer suitable for DS-CDMA UWB modem receiver having improved complexity.

As shown in FIG. 3, the parallel equalizer for the DS-CDMA UWB modem receiver includes a weight update block (WUB) 34, L delaying blocks 31, L filter blocks (FB) 32, and L symbol decision blocks 33.

The WUB updates the filter tap coefficients based on an input signal of the parallel equalizer inputted from a rake receiver 12 and a symbol error extracted in a first symbol decision block 33. The delaying block 31 delays the input signal of the parallel equalizer and obtains N signals used in the FB 32 and the WUB. Herein, the delaying block 31 is illustrated as a separate block, but the delaying block 31 may be included in the FB 32 and the WUB 34.

The L FBs 32 obtain L symbol decision signals by using the updated filter tap coefficients from the WUB 34 and the L input signals of the parallel equalizer. The L symbol decision blocks 33 decide transmission symbols based on results from the L FBs 32 or obtain the symbol error.

Among the L input signals of parallel equalizer outputted from the rake receiver 12, a first input signal $r_n$ 301 is used as an input signal of a first FB; a second input signal $r_{n-1}$ 305 is used as an input signal of a second FB; a $L^{th}$ input signal $r_{n-(L-1)}$ 307 is used as an input signal of a $L^{th}$ FB.

When the parallel equalizer operates in a 'training mode', only the first FB is operated among L FBs and when the parallel equalizer operates in a 'symbol decision mode', the L FBs are all operated.

The parallel equalizer includes L equalizing blocks having the same structure. A first equalizing block will be described as below and L−1 numbers of equalizing blocks are designed as the same as the first equalizing block.

As shown in FIG. 3, the N input values ($r_n$, $r_{n-L}$, ..., $r_{n-L(N-1)}$) used in the FB 32 and the WUB 34 are generated by passing the input signal $r_n$ of the parallel equalizer through N−1 D flip-flops 340 to 342. When the parallel equalizer operates in the 'training mode', only the first FB is operated. Herein, $r_n$ inputted into the first FB in the 'training mode' is defined as a 'training input signal'. Meanwhile, although the L FBs are operated when the parallel equalizer operates in the 'symbol decision mode', only the first FB participates to extract a symbol error used for updating the filter tap coefficients. Therefore, $r_n$ inputted into the first FB in the 'symbol decision mode' is defined as a 'symbol error calculation input signal'.

The FB 32 includes N multiplier 330 to 333 for multiplying the N filter tap coefficients ($c_{n,0,0}$, $c_{n,0,1}$, ..., $c_{n,0,N-1}$) updated in the WUB 34 and the N input signals ($r_n$, $r_{n-L}$, ..., $r_{n-L(N-1)}$) outputted from the delaying block 31, respectively, and adders 321 to 323 for adding results from the multipliers. Then, the adding result is transmitted into the slicer 325 through a bit regulator 324.

In the parallel equalizer in accordance with the present invention, a first symbol decision block 33 obtains a symbol error $e_{n,0}$ 329, transmits the symbol error into the WUB 34 or decides a transmission symbol $S_n$ 395. And, L−1 symbol decision blocks are operated in 'symbol decision block', decides transmission symbols 396 to 398 and do not obtain the symbol error.

First, when the parallel equalizer operates in the 'training mode', the training symbol $S_n$ 399 is inputted into a subtractor 326 by moving a switch into downside. That is, the training symbol is adopted as symbol signal. Then, the subtractor 326 obtains a symbol error $e_{n,0}$ 329 by subtracting the training symbol $S_n$ and symbol decision signal $y_{n,0}$ 328.

Meanwhile when the parallel equalizer operates in the 'symbol decision mode', a symbol signal $S_n$ from the slicer 325 is inputted into the subtractor 326 by moving a switch into upside. Then, the subtractor 326 obtains a symbol error $e_{n,0}$ 329 by subtracting the symbol signal $S_n$ 395 and symbol decision signal $y_{n,0}$ 328.

Below, the WUB will be described in detail. The parallel equalizer in accordance with the present invention includes one WUB 34 for improving complexity different from the conventional parallel equalizer.

The WUB 34 includes N first multipliers 350 to 353, N second multipliers 360 to 363, N D flip-flops 380 to 383, N adders 370 to 373 and N bit regulators 385 to 388. Each element will be described below.

The N first multipliers 350 to 353 multiply the symbol error $e_n$ 329 from the symbol decision block 33 and the N input signals ($r_n$, $r_{n-L}$, ..., $r_{n-L(N-1)}$) 301 to 304, respectively.

The N second multipliers 360 to 363 multiply the multiplying results of the N first multipliers 350 to 353 and the step size $\Delta_f$ for updating the filter tap coefficients in every symbol. The N second multipliers 360 to 363 shown in FIG. 3 are embodied as shift operators performing a right or left shifting in practice.

The N adders 370 to 373 calculate new filter tap coefficients by adding the previous filter tap coefficients stored in D flip-flops 380 to 383 and result from the corresponding second multiplier, respectively. Herein, the D flip-flops 380 to 383 store the result (the previous filter tap coefficients) within one symbol duration to update the filter tap coefficients continuously. The bit regulators 385 to 388 control bits of the filter tap coefficients.

When 'next symbol' is inputted, the resulting filter tap coefficients are reused for determining a transmission symbol in the FB 32 and updating the filter tap coefficients in WUB 34.

Figure 4:
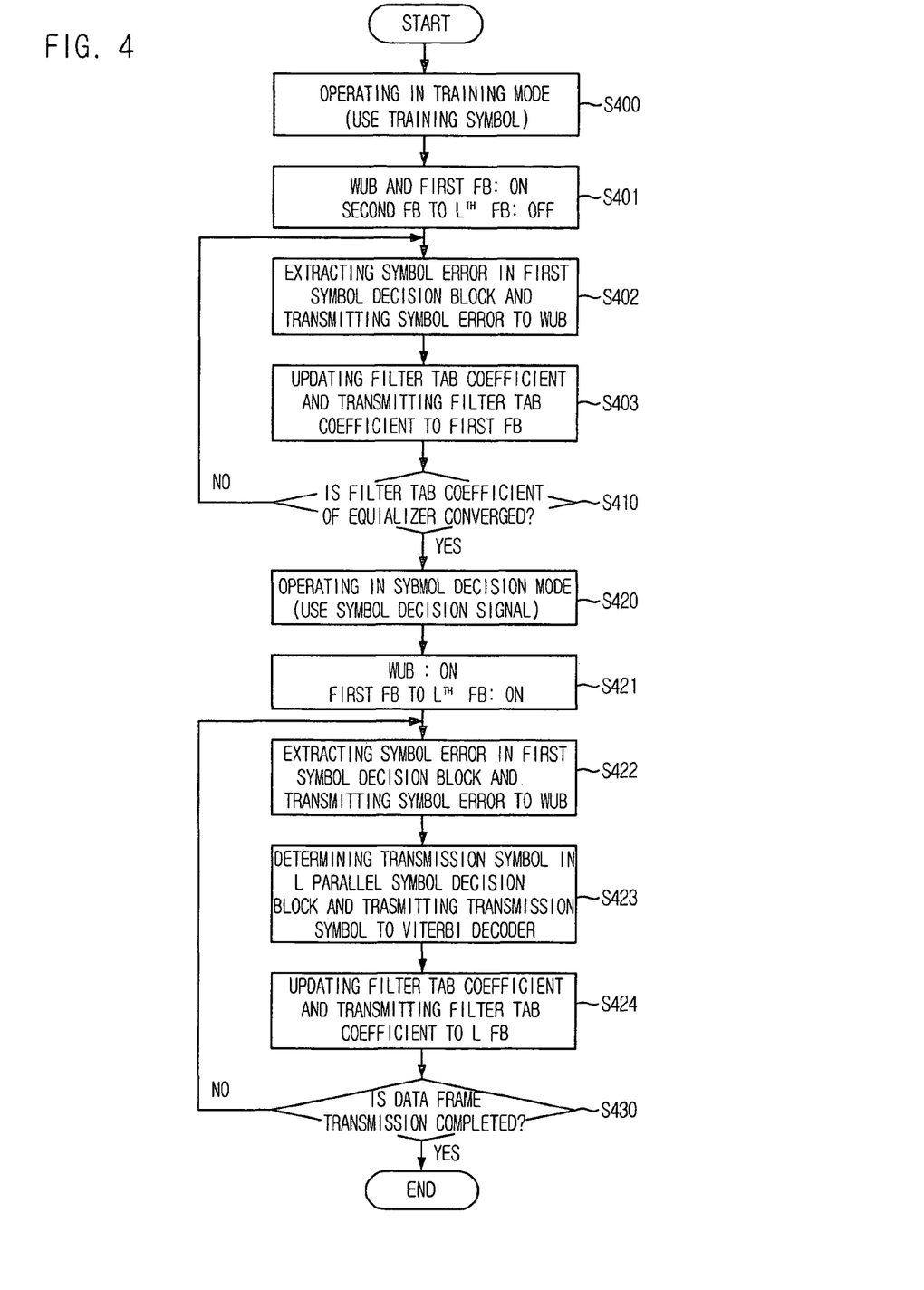
FIG. 4 is a flowchart illustrating a method of optimizing filter tap coefficients and deciding a transmission symbol in accordance with an embodiment of the present invention.

FIG. 4 is a flowchart illustrating a method of optimizing the filter tap coefficients and deciding a transmission symbol in accordance with an embodiment of the present invention. FIG. 4 illustrates adaptation of the filter tap coefficients of the parallel equalizer suitable for DS-CDMA UWB modem receiver and decision of the transmission symbols from the transmitter. That is, one WUB and L FBs are used for determining the transmission symbols in the parallel equalizer of present invention.

First, when the parallel equalizer operates in the 'training mode' within transmission of a preamble period, training symbol is used at step S400. That is, the training symbol $S_n$ 399 is inputted into a subtractor 326 by moving a switch 327 located in the first symbol decision block 33 into downside in the 'training mode'.

In the 'training mode', the filter tap coefficients are adapted based on the WUB 34 and a first FB, and L−1 FBs, i.e., a second FB to $L^{th}$ FB do not operated at step S401. After a first decision block 33 adapts the training symbol $S_n$ 399, a symbol error $e_{n,0}$ 329 is extracted from the training symbol and a symbol decision signal $y_{n,0}$ 328 and transmitted into the WUB 34 at step S402.

Then, the WUB 34 updates the filter tap coefficients based on the symbol error 329, input signals of equalizer 301 to 304 and a step size 365 to 368 and optimizes the number of bits by using the bit regulators 385 to 388. Then, the bits optimized filter tap coefficients are transmitted into the first FB at step S403.

Then, it is determined that whether the filter tap coefficients of the WUB are sufficiently converged or not at step S410. When the filter tap coefficients are converged sufficiently, parallel equalizer is operated in the 'symbol decision mode' at step S420. Otherwise, when the filter tap coefficients are not converged sufficiently, updating step of the filter tap coefficients at step S403 is repeated based on an extracted symbol error transmitted into the WUB at step S402.

Herein, in conformation methods that whether the filter tap coefficients are converged or not, there is a method that comparing a magnitude of the symbol error obtained from the symbol decision bock and a magnitude of a predetermined threshold value. Also, after a convergence time (K) of the filter tap coefficients are calculated by using a simulation and it is conformed that an adaptation time of the filter tap coefficients is over the convergence time (K).

In present invention, the filter tap coefficients of the WUB are assumed to be converged sufficiently within transmission of a preamble duration. Moreover, the parallel equalizer is assumed to be operated in the 'training mode' during transmission of the preamble and in the 'symbol decision mode' during transmission of a data frame. In present invention, the conformation method whether equalizer convergent or not is decided as comparing the calculated convergence time and convergence time of the filter tap coefficients. Moreover, entire structure of the parallel equalizer is designed based on transmission of the preamble varying in accordance with the convergence time of the filter tap coefficients. Therefore, final updating filter tap coefficients in the 'training mode' are used as an initial filter tap coefficients in the 'symbol decision mode'.

Meanwhile, when the filter tap coefficients are converged, i.e., when the data frame is transmitted into the parallel equalizer, the parallel equalizer is operated in the 'symbol decision mode' adopting symbol decision value 395 from the symbol decision block 33 by switching the switch 327 at step S420. Then, one WUB and L FBs are operated at step S421. A first symbol decision block extracts the symbol error 329 and transmits the symbol error into the WUB 34 at step S422.

Then, L symbol decision blocks determine the transmission symbol based on the symbol decision signal transmitted from the L parallel FBs, respectively. The determined transmission symbol is transmitted into the viterbi decoder 14 at step S423.

Then, the WUB 34 updates the filter tap coefficients based on the symbol error 329, input signals of the equalizer 301 to 304 and a step size 365 to 368 and optimizes the number of bits by using the bit regulators 385 to 388. Then, the bits optimized filter tap coefficients are transmitted into the L FBs at step S424.

Next, it is determined that whether transmission of a data frame is completed or not at step S430. When the data frame transmission is completed, the equalizing operation comes to end. Otherwise, when transmission of the data frame is not completed, steps S422 to S424 are repeated until transmission of the data frame is completed.

As described above, the parallel equalizer according to the present invention can reduce a hardware complexity of 40% more than the conventional parallel equalizer. Also, the power consumption of the parallel equalizer can be reduced remarkably.

That is, the parallel equalizer according to the present invention includes one WUB and L FBs different from the conventional equalizer having L WUBs and L FBs. In the preamble transmitting duration, the filter tap coefficients of the parallel equalizer are converged based on the training symbol and operating one WUB and one FB. In the data frame transmitting duration, the parallel equalizer operated in the 'symbol decision mode' and extracts transmission symbol from the transmitter by operating one WUB and L FB. Therefore, the complexity of the receiving system can be reduced so that the power consumption can be reduced remarkably.

Referring to Table 1, comparing complexity of hardware between the parallel equalizer of present invention and the conventional parallel equalizer will be described in detail.

TABLE 1

|  | Number of Multiplier(s) | | | Number of adder(s) | | |
|---|---|---|---|---|---|---|
|  | FB | WUB | Calculating symbol error | FB | WUB | Calculating symbol error |
| Conventional parallel equalizer | L × N | L × N | — | L(N − 1) | L × N | L |
| Parallel equalizer of present invention | L × N | N | — | L(N − 1) | N | 1 |

Generally, bits number of multipliers used in WUB of the parallel equalizer is more than bits number of multipliers used in FB. The parallel equalizer of present invention reduces complexity 40% than the conventional parallel equalizer. Moreover, the FB and the symbol decision block are operated when the parallel equalizer in the 'training mode', power consumption can be reduced remarkably.

In a word, the present invention is the parallel equalizer suitable for the DS-CDMA UWB modem receiver. Referring to FIG. 4, the parallel equalizer is operated in the 'training mode' based on the training symbol during transmission of the preamble, the parallel equalizer determines the transmission symbol in the 'symbol decision mode' during transmission of the data frame.

The methods in accordance with the embodiments of the present invention can be realized as programs and stored in a computer-readable recording medium that can execute the programs. Examples of the computer-readable recording medium include CD-ROM, RAM, ROM, floppy disks, hard disks, magneto-optical disks and the like.

The present application contains subject matter related to Korean patent application Nos. 2005-0121108 and 2006-0059468, filed with the Korean Intellectual Property Office on Dec. 9, 2005, and Jun. 29, 2006, respectively, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A parallel equalizer for a DS-CDMA UWB system, comprising:

a filtering unit for filtering a training input signal which is one among a plurality of input signals when the parallel equalizer operates in a 'training mode', and filtering the plurality of input signals in parallel when the parallel equalizer operates in a 'symbol decision mode';

a symbol decision unit for obtaining a symbol error based on a output from the filtering unit and a training symbol in the 'training mode', and estimating a transmission symbol for each of the input signals based on outputs from the filtering unit in the 'symbol decision mode', obtaining an error of one among the estimated transmission symbols for a symbol error calculating input signal; and an weight updating unit for updating filter tap coefficients of the filtering unit based on the training input signal or the symbol error calculating input signal and the symbol error obtained in the symbol decision unit and transmitting the updated filter tap coefficients into the filtering unit, wherein the filtering unit includes a first filter block and a plurality of filtering blocks to perform parallel filtering of the plurality of input signals in parallel; and wherein the first filtering block performs filtering of the training input signal in the 'training mode' and the first and the plurality of filtering blocks perform filtering of the plurality of input signals in the 'symbol decision mode', wherein a first updated filter tap coefficients transmitted to the first filtering block for the training input signal operated in the training mode are configured to be generated prior to generating a second updated filter tap coefficients transmitted to the first and the plurality filtering blocks for the plurality of input signals in parallel operated on the symbol decision mode, wherein the first updated tap coefficients are configured to be used for determining the second updated filter tap coefficients transmitted to the filtering unit for the plurality of input signals in parallel operated on the symbol decision mode, and wherein each of the updated first and second tap coefficients are configured to be generated within transmission of a preamble duration.

2. The parallel equalizer as recited in claim 1, wherein the 'training mode' is a mode for operating the parallel equalizer during transmission of the preamble of the input signal and the 'symbol decision mode' is a mode for operating the parallel equalizer during transmission of a data frame of the input signal.

3. The parallel equalizer as recited in claim 1, wherein the symbol decision unit includes a plurality of symbol decision blocks; and wherein each of the plurality of input signals is processed by a corresponding symbol decision block; and wherein each of the symbol decision blocks obtain a symbol error based on the output of the first filtering block and the training symbol in the 'training mode' and each of the plurality of symbol decision blocks estimate transmission symbols for output signals from corresponding filtering blocks, and obtain the symbol error based on the output of the filtering block and the estimated transmission symbol for the symbol error calculating input signal in the 'symbol decision mode'.

4. The parallel equalizer as recited in claim 3, wherein weight updating unit transmits the updated filter tap coefficients into the filtering block in the 'training mode' and transmits the updated filter tap coefficients into the plurality of filtering blocks in the 'symbol decision mode'.

5. The parallel equalizer as recited in claim 3, wherein the training input signal and the symbol error calculating input signal is the one among the plurality of input signals.

6. A method for equalizing a signal in parallel for a DS-CDMA UWB system, comprising:

filtering a training input signal, by a filtering unit, which is one among a plurality of input signals when the parallel equalizer operates in a 'training mode', and filtering the plurality of input signals in parallel when the parallel equalizer operates in a 'symbol decision mode';

obtaining a symbol error, by a symbol decision unit, based on a output from the filtering unit and a training symbol in the 'training mode', and estimating a transmission symbol for each of the input signals based on outputs from the filtering unit in the 'symbol decision mode', obtaining an error of one among the estimated transmission symbols for a symbol error calculating input signal; and updating filter tap coefficients of the filtering unit, by a weight updating unit, based on the training input signal or the symbol error calculating input signal and the symbol error obtained in the symbol decision unit and transmitting the updated filter tap coefficients into the filtering unit, wherein the filtering unit includes a first filter block and a plurality of filtering blocks to perform parallel filtering of the plurality of input signals in parallel; and wherein the first filtering block performs filtering of the training input signal in the 'training mode' and the first and the plurality of filtering blocks perform filtering of the plurality of input signals in the 'symbol decision mode', wherein a first updated filter tap coefficients transmitted to the first filtering block for the training input signal operated in the training mode are configured to be generated prior to generating a second updated filter tap coefficients transmitted to the first and the plurality filtering blocks for the plurality of input signals in parallel operated on the symbol decision mode, wherein the first updated tap coefficients are configured to be used for determining the second updated filter tap coefficients transmitted to the filtering unit for the plurality of input signals in parallel operated on the symbol decision mode, and wherein each of the updated first and second tap coefficients are configured to be generated within transmission of a preamble duration.

7. The method as recited in claim 6, wherein the filter tap coefficients are determined to be converged when transmission of the preamble of the input signal is complete.

8. The method as recited in claim 6, wherein the training input signal and the symbol error calculating input signal is the first input signal among the plurality of input signals.

* * * * *